(12) United States Patent
Hertz et al.

(10) Patent No.: US 8,460,399 B2
(45) Date of Patent: Jun. 11, 2013

(54) WEAK ACID BASED CONCRETE STAIN

(75) Inventors: Sanford Lee Hertz, Hoffman Estates, IL (US); Ed Daraskevich, Oswego, IL (US); William W. Tao, Downers Grove, IL (US); Jason J. Netherton, Kenosha, WI (US); Matthew S. Gebhard, Cary, IL (US)

(73) Assignee: Valspar Corporation, Minneapolis, MN (US)

( * ) Notice: Subject to any disclaimer, the term of this patent is extended or adjusted under 35 U.S.C. 154(b) by 1043 days.

(21) Appl. No.: 11/746,657

(22) Filed: May 10, 2007

(65) Prior Publication Data
US 2008/0276387 A1 Nov. 13, 2008

(51) Int. Cl.
*D06P 3/80* (2006.01)

(52) U.S. Cl.
USPC ............... 8/522; 8/618; 8/623; 8/625; 8/628; 8/658; 106/156.23; 523/126

(58) Field of Classification Search
USPC . 8/522, 658, 618, 623, 625, 628; 106/156.23; 523/126; 427/403
See application file for complete search history.

(56) References Cited

U.S. PATENT DOCUMENTS

| | | | |
|---|---|---|---|
| 3,930,740 A | 1/1976 | Bowman | |
| 5,120,611 A * | 6/1992 | Ogura | 428/552 |
| 5,609,681 A * | 3/1997 | Drs et al. | 106/802 |
| 5,672,279 A * | 9/1997 | Sargent et al. | 210/698 |
| 5,733,463 A | 3/1998 | Sargent et al. | |
| 5,735,094 A | 4/1998 | Zember | |
| 6,294,011 B1 | 9/2001 | Hedouin et al. | |
| 6,500,249 B1 * | 12/2002 | Dodson | 106/34 |
| 6,528,120 B2 | 3/2003 | Brown | |
| 6,596,074 B2 | 7/2003 | Pomeroy | |
| 6,652,907 B1 | 11/2003 | Stever | |
| 6,884,753 B2 * | 4/2005 | Sakatani et al. | 502/350 |
| 7,071,153 B2 | 7/2006 | Lewis et al. | |
| 7,658,805 B2 | 2/2010 | Netherton | |
| 2003/0146538 A1 * | 8/2003 | Sambrook et al. | 264/211 |
| 2004/0151950 A1 * | 8/2004 | Good | 428/703 |
| 2004/0231252 A1 | 11/2004 | Benjamin et al. | |
| 2005/0208285 A1 | 9/2005 | Lyons et al. | |
| 2006/0023042 A1 * | 2/2006 | Doi | 347/100 |
| 2006/0030490 A1 * | 2/2006 | Hayashi et al. | 504/353 |
| 2006/0063689 A1 * | 3/2006 | Netherton | 510/240 |
| 2006/0157895 A1 | 7/2006 | Watling | |
| 2006/0167178 A1 * | 7/2006 | Kitamura et al. | 524/833 |
| 2007/0110981 A1 | 5/2007 | Killilea et al. | |
| 2008/0187668 A1 | 8/2008 | Auger | |
| 2009/0208763 A1 | 8/2009 | Harris | |

OTHER PUBLICATIONS

Hawley's Condensed Chemical Dictionary, entry on "pK", copyright 2002.*
International Search Report mailed Aug. 8, 2008 (2 pgs).
http://netcomposites.com, Guide to Composites, Polyester Resins, Feb. 23, 2007.

* cited by examiner

*Primary Examiner* — Harold Pyon
*Assistant Examiner* — Katie L Hammer
(74) *Attorney, Agent, or Firm* — Kagan Binder, PLLC

(57) ABSTRACT

The present invention provides compositions and methods which are adapted to impart color to concrete or mineral substrate surfaces. Specifically, the present invention relates to a composition and methods adapted to treat concrete surfaces which have the advantage of using a non-corrosive acid-based solution.

35 Claims, No Drawings

WEAK ACID BASED CONCRETE STAIN

FIELD OF THE INVENTION

The present invention relates generally to compositions and methods which are adapted to impart color to cementitious or mineral substrate surfaces. Specifically, the present invention relates to a composition and method adapted to treat cementitious surfaces which have the advantage of using a non-corrosive acid-based solution.

BACKGROUND

Cement-based compositions enjoy broad application in construction materials, tile setting, wall and pool plasters, stucco, self leveling compounds, roofing tiles and cement patches. Concrete and like materials are produced from the alkaline earth metals typically by mixing portland cement with sand, gravel, and water. The reaction of the cement with the water produces among other things metal carbonates such as calcium carbonate. The calcium carbonate in the mixture is insoluble in water but reacts readily with most acids.

There has been a desire for some time to produce colored concrete to improve the decorative appearance of concrete. For example, U.S. Pat. No. 3,930,740 discloses tools for imprinting non-repeating stone patterns in fresh concrete to which color is added. U.S. Pat. No. 5,735,094 discloses a process for applying an ornamental coating comprised of liquid mortar which includes a color pigment. The addition of dyes and pigments to the cementitious materials has also enjoyed wide application in all of the above mentioned materials.

There are several processes for coloring or ornamenting a concrete surface that are known in the art. These include sweeping partially set concrete to produce a broom surface or adding a coloring agent that is mixed into the concrete blend. However, afterwards, a thorough clean-up of the applicator equipment is necessary, resulting in considerable labor and expense. This method is costly and inefficient, as coloring agents are expensive, become mixed throughout the concrete, and are only needed at the surface where they are visible. More elaborate surface treatments are known, including embedding stones varying in size or color into concrete areas by means of cement or resin.

One of the more common processes known in the art for coloring or staining concrete involves washing a concrete surface with an acidic solution containing a metallic salt. After application of the acidic staining solution and development of the color, a neutralizing agent is commonly applied to the stained concrete and a clear protection polymeric sealer costing is applied.

A second common method in the art of coloring concrete involves washing the concrete surface with an acidic solution to roughen or etch the surface; neutralize and rinse away the etching solution with a mixture of common baking soda and water; coloring the surface with a polymer based stain or paint, and finishing the surface with a clear coating.

Another known process involves washing a concrete surface with acidic solution to clean the concrete, applying a layer of polymers to the concrete surface, applying a first layer of an aqueous solution of cement and polymers to the coated concrete surface, applying a template with adhesive backing to selected regions of the first layer of cement and polymers, applying a second cement and polymer layer over the template and the first coating layer, applying colored materials to the second cement and polymer layer prior to the curing of the second layer, and removing the template to expose the colored concrete surface. A sealer may also be applied over the colored concrete surface.

However, these coating processes involve the use of highly corrosive acidic solutions, which are dangerous to handle. If the use of the acid is eliminated, the coloring of the concrete is not permanent and is prone to peeling and erosion. Consequently, there exists an unfulfilled need for a concrete coloring process that uses a permanent less corrosive coloring agent that results in a decorative, durable, coated concrete surface.

SUMMARY OF THE INVENTION

Traditional concrete acid stains use hydrochloric acid to decompose the calcium carbonate and calcium oxide in the concrete, and to facilitate the ion exchange with the metallic salt, which imparts the color to the surface of the material. However, the use of hydrochloric acid involves the production of excessive fumes of hydrogen chloride, which are irritating to the skin and eyes and toxic. In addition, the hydrochloric acid solution is very corrosive and thus dangerous to handle and use. The inventors have discovered that the use of an acid and a weak base, such as hydrochloric acid and urea, provides an effective and safe means to stain cementitious substrates.

Typically all acid stains must be rinsed after application to remove excessive salt precipitate. Acid stains that use hydrochloric acid must be neutralized prior to rinsing, or the runoff from the rinse can stain adjacent concrete. Typical neutralizing agents used are ammonia or sodium hydroxide, or baking soda solutions. An additional advantage of combining an acid with a weak base is that the stained concrete self neutralizes during the staining process. This eliminates the need to go through a neutralization step before rinsing.

DETAILED DESCRIPTION OF THE INVENTION

The current invention relates to compositions and methods for imparting color to a cementitious or mineral substrate. The composition includes an acid with a pKa of less than 6, a weak base such that the conjugate acid of the weak base has a pKa of less than 7 and greater than the pKa of the acid, and one or more water soluble metallic salts. In various embodiments, the water-soluble metal salts of the composition can include salts of the transition elements. In some embodiments, the weak base can decompose when it is applied to the cementitious materials such that the decomposition products are stronger bases.

The strength of a base is defined by the pKa of its conjugate acid. The higher the pKa of the bases conjugate acid the stronger the base. For example acetate is a weak base where the conjugate acid (acetic acid) has a pKa of 4.75. Lactate is a weak base where the conjugate acid (lactic acid) has a pKa of 3.86. Given this definition, acetate would be considered a stronger base than lactate.

Certain embodiments will include a weak base that can decompose into components that have a vapor pressure greater than 0.01 psi at 25° C. upon application to substrate. In some embodiments, the acid is a hydrogen halide. In yet others, the weak base are preferably urea.

Weak bases useful in the present invention include:
(1) substituted ureas of the following formula

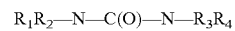

where R1, R2, R3 and R4 are C1-C10 carbon groups or hydrogen. For example urea, tetramethyl urea, acetylurea, imidazolidinone, or substituted imidazolidones, pyrimidinone, pyrimidinedione, and the like;

(2) amides such as formamide, and dimethyl formamide, or acetamides such as dimethyl acetamide, caprolactam; and, pyrollidone;

(3) esters of carbonic acid such as alkyl and aryl carbonates, such as dimethyl carbonate, propylene carbonate, ethylene glycol bis methyl carbonate, ethyl M-tolyl carbonate;

(4) carbamates such as alkyl and aryl carbamates, such as ethyl ethylcarbamate, oxazolidinone, and oxazolidinedione; and, (5) amino acids such as glycine, alanine, leucine, valine, phenylalanine, aspartic acid, glutamic acid, cysteine, lysine, and histidine.

Additional examples of weak bases include alkanolamines, including triethanolamine, diethanoamine, monoethanolamine and alkoxylated amines of the following formula $(HO-[(R)-O]_x-R)_y-NH_{3-y}$, wherein the R is a C2 to C8 alkyl group, and x can vary from 1 to 100, and y can vary from can vary from 1 to 3; polymers with nitrogen-containing heterocyclic groups (including but not limited to pyridine, pyrimidine, imidazole, tetrazole, pyrazine, quinoline, isoquinoline, indole, isoindole, benzimidazole, purine, pyrrole, isopyrazole, quinazoline, pyridazine, pyrazine, cinnoline, phthalazine, quinoxaline, xanthine, hypoxanthine, and pteridine); polymers and copolymers of acrylamide, and cyclic amides such as caprolactam; pyrollidone, polyvinyl pyrollidone, copolymers of vinyl pyrollidone, methacrylamide, polymethacrylamide, copolymers of methacrylamide, ammonia, guanidine, hydroxyurea, semicarbazide; mono-, di-, or tri(alkyl or aryl)urea, and wherein in the case of di(alkyl or aryl)urea the alkyl or aryl groups can be on the same or different nitrogen atoms, O-methyl hydroxyl amine (methoxylamine), aniline, and hydrazine. Preferred bases are nitrogenous bases. Preferred are substituted ureas. Most preferred is urea.

Acids useful in the present invention can include carboxylic acids such as acetic, maleic, citric, formic, and benzoic; phosphoric, phosphonic such as ethyl phosphonic acid; polyphosphoric acids such as pyrophosphoric, and hexameta phosphoric; sulfuric, sulfonic such as benzyl sulfonic acid, nitric or nitrous acid, hydrogen halides such as hydrogen fluoride, hydrogen chloride, hydrogen bromide, and hydrogen iodide. Preferred are phosphoric and polyphosphoric acids, nitric or nitrous acid, and hydrogen chloride. More preferred are phosphoric, pyrophosphoric, and hydrogen chloride. Most preferred is hydrogen chloride.

Metal salts in the various compositions of the invention can include chloride, sulfate, nitrate, nitrite, phosphate, or phosphonate salts of titanium, vanadium, chromium, manganese, iron, cobalt, nickel, copper, aluminum, magnesium, or barium.

The compositions of the present invention can further comprise a metal ion completing agent, such as EDTA, amino phosphonates sold under the trade name Dequest™, phosphate or polyphosphates. The compositions of the present invention can further comprise a surfactant, dispersant, or organic solvent capable of improving the wetting of the composition.

Such solvents can include: water miscible solvents such as methanol, ethanol, propanol, acetone, ethylene glycol alkyl ethers, propylene glycol alkyl ethers and diacetone alcohol; and water immiscible solvents such as alkyl acetates, butyl acetate, methyl isoamyl ketone, amyl acetate, diisobutyl ketone, xylene, toluene, butanol, and mineral spirits. The compositions of the present invention can further comprise a defoamer such as a silicone, petroleum, mineral, natural oil, or a polymeric defoamer.

Typical surfactants can include anionic and nonionic surfactants. Suitable anionic surfactants include, for example, the higher fatty alcohol sulfates, such as sodium lauryl sulfate; alkylaryl sulfonates such as sodium or potassium isopropylbenzene sulfonates or isopropyl naphthalene sulfonates; alkali metal higher alkyl sulfosuccinates, such as sodium octyl sulfosuccinate, sodium N-methyl-N-palmitoylaurate, sodium oleyl isothionate; alkali metal salts and ammonium salts of alkylarylpolyethoxyethanol sulfates, sulfonates, or phosphates, such as sodium tert-octylphenoxypolyethoxyethyl sulfate having 1 to 50 oxyethylene units; alkali metal salts and ammonium salts of alkyl polyethoxyethanol sulfates, sulfonates, and phosphates; and alkali metal salts and ammonium salts of aryl polyethoxyethanol sulfates, sulfonates, and phosphates.

Suitable nonionic surfactants include alkylphenoxypolyethoxyethanols having alkyl groups of from about 7 to 18 carbon atoms and from about 6 to about 60 oxyethylene units, such as heptylphenoxypolyethoxyethanols, methyloctyl phenoxypolyethoxyethanols; polyethoxyethanol derivatives of methylene-linked alkyl phenols; sulfur-containing agents such as those made by condensing from about 6 to 60 moles of ethylene oxide with nonyl mercaptan, dodecyl mercaptan, or with alkylthiophenols wherein the alkyl groups contain from 6 to 16 carbon atoms; ethylene oxide derivatives of long chained carboxylic acids, such as lauric acid, myristic acid, palmitic acid, oleic acid, or mixtures of acids such as those found in tall oil containing from 6 to 60 oxyethylene units per molecule; analogous ethylene aside condensates of long chained alcohols such as octyl, decyl, lauryl, or cetyl alcohols, ethylene oxide derivatives of etherified or esterified polyhydroxy compounds having a hydrophobic hydrocarbon chain, such as sorbitan monostearate containing from 6 to 60 oxyethylene units; block copolymers of ethylene oxide section combined with one or more hydrophobic propylene oxide sections.

Typical dispersants can include polymers and copolymers of ethylenically unsaturated carboxylic acids such as (meth) acrylic acid, fumaric acid, itaconic acid, maleic acid, maleic anhydride, and monoesters of fumaric acid; phosphorus acid monomers such as phosphoethyl(meth)acrylate and ally phosphonic acid; and sulfur acid monomers such as 2-acrylamido-2-methyl-1-propanesulfonic acid, sulfoethyl(meth) acrylate, and vinyl sulfonic acid. This would include dispersants marketed under the trade name Tamol™. Citric acid, oxalic acid, phosphoric acid, pyrophosphoric acid, and poly phosphoric acids may also be employed.

The current invention also provides methods for staining the surface of a cementitious or mineral substrate comprising applying any of the compositions described herein to the surface of a cementitious or mineral substrate. The methods can be done in a single operation comprising:

(a) completely wetting the surface with an excess of the stain solution
(b) permitting the composition to react with the substrate and develop color,
(c) permitting said stain pigment to dry in place
(d) optionally applying an acid neutralizing solution to the stained cementitious or mineral surface Neutralizing solutions can include aqueous solutions of weak bases such as carbonate and bicarbonate salts such as sodium, potassium, lithium, cesium, ammonium(bi)carbonate; or phosphate salts such disodium, dipotassium, dilithium, dicesium, or diammonium phosphate; or organic alkalinity sources such as alkylamines and alkanolamines.

A method of the current invention for staining the surface of a cementitious or mineral substrate is also provided wherein a transparent wax or polymeric coating is applied to the previously stained concrete or mineral substrate.

Under certain circumstances it may be desirable to apply a wax clear coating to the previously stained concrete. Typical waxes useful in the present invention include: natural plant or beeswaxes, paraffin, carnauba, and these aforementioned natural waxes modified with organic polymers such as polyethylene, polypropylene, or polytetrafluoroethylene.

Typical polymers useful in the present invention include: acrylic, styrene-acrylic, polyurethane, polyester, alkyd, expoxy-ester, silicone, and epoxy-amide. It is particularly advantageous to utilize polymer chemistries which crosslink after application over the stained concrete. Examples of suitable crosslinking polymers would be those employing air curable drying oil functionality, epoxy-amide reactions, siloxane condensation, hydrazide-carbonyl reactions, aziridine-acid reactions, isocycante-hydroxy reactions, or carbodiimide-acid reactions. Preferred are those chemistries which offer a high degree of wear resistance. Most preferred are air drying epoxy-esters, two component epoxy amides, air curable alkyds, and aziridine crosslinked polyurethanes.

The stain can be applied by any conventional means known to those skilled in the art, for example by spraying or brushing it onto the concrete surface. Typically, the method of application will affect the final outcome. For example, spraying on the stain will create a more natural look, while brushing will create a more uniform outcome. The use of multiple coats involving different stains will create a greater variety of successful color choices.

EXAMPLES

The following are non-limiting examples of stain compositions which serve to further illustrate advantages of the disclosed invention.

Example 1

| Material | Weight (lb) | Vol (gal.) |
| --- | --- | --- |
| Water | 54.75 | 6.57 |
| Urea monohydrochloride | 9 | 0.89 |
| 32% FeCl$_2$ solution | 37.5 | 3.51 |
| Silicone defoamer[1] | 0.1 | 0.011 |
| Total | 101.35 | 10.98 |

[1]Proprietary commercially available foam destroying polymers and polysiloxanes This example provides for a "fawn" or tan colored stain material.

Example 2

| Material | Weight (lb) | Vol (gal.) |
| --- | --- | --- |
| Water | 48.26 | 5.79 |
| Urea monohydrochloride | 9 | 0.89 |
| CuCl$_2$2H$_2$O | 15.3 | 0.72 |
| Water | 18 | 2.16 |
| 32% FeCl$_2$ solution | 9 | 0.84 |
| Silicone defoamer[1] | 0.1 | 0.012 |
| Total | 99.66 | 10.41 |

[1]Proprietary commercially available foam destroying polymers and polysiloxanes This exam pie provides for an olive-colored or green stain material.

Example 3

| Material | Weight (lb) | Vol (gal.) |
| --- | --- | --- |
| Water | 19.89 | 2.38 |
| Urea monohydrochloride | 9.89 | 0.98 |
| Silicone defoamer[1] | 0.1 | 0.011 |
| FeCl$_3$ Solution, 40% | 31.25 | 2.67 |
| MnCl$_2$4H$_2$O | 21.43 | 1.27 |
| Urea monohydrochloride | 1.75 | 0.17 |
| Water | 15.78 | 1.89 |
| Total | 100.09 | 9.37 |

[1]Proprietary commercially available foam destroying polymers and polysiloxanes This example provides for a "coffee" or brownish colored stain material.

These embodiments or examples should be considered to be non-limiting and are presented to illustrate just a few of the possibilities of the compositions and methods of the present invention. While the principles of this invention have been described in connection with specific embodiments, it should be clearly understood that these descriptions are made only by way of example and are not intended to limit the scope of the invention. As such, the present invention may be embodied in other specific forms without departing from the spirit or essential attributes thereof, and, accordingly, reference should be made to the appended claims, rather than to the foregoing specification as indicating the scope of the invention.

We claim:

1. An acid based cementitious or mineral substrate coloring composition that includes ingredients comprising:
   a. a first acid which has a pKa less than 6;
   b. a weak base, wherein the conjugate acid of the weak base has a pKa less than 7 and greater than the pKa of the first acid; and
   c. one or more metallic salts that impart a color to the substrate when the coloring composition is applied to and chemically reacts with the cementitious or mineral substrate.

2. The composition of claim 1, wherein the first acid has a pKa less than 5.

3. The composition of claim 1, wherein the first acid has a pKa less than 1.

4. The composition of claim 1, wherein in the one or more metal salts are one or more salts of one or more transition elements.

5. The composition of claim 1, wherein the weak base decomposes upon application of the composition to the substrate into components that include a stronger base than the weak base.

6. The composition of claim 1, wherein the weak base decomposes upon application to the substrate into components that include a component having a vapor pressure greater than 0.01 psi at 25° C.

7. The composition of claim 1, wherein the first acid is a hydrogen halide.

8. The composition of claim 1, wherein the weak base is urea or a substituted urea.

9. The composition of claim 1, wherein the one or more metal salts are selected from chloride, sulfate, nitrate, nitrite, phosphate, or phosphonate salts of titanium, vanadium, chromium, manganese, iron, cobalt, nickel, copper, aluminum, magnesium, and/or barium.

10. The composition of claim 1, further comprising a metal ion complexing agent.

11. The composition of claim 1, further comprising a surfactant, dispersant, or an organic solvent capable of improving the wetting of the composition on the substrate.

12. The composition of claim 1, further comprising a silicone, petroleum, mineral, natural oil, or polymeric defoamer.

13. The composition of claim 1, wherein the first acid is HCl and the base is urea or a substituted urea.

14. The composition of claim 1, wherein the first acid and base are supplied as urea monohydrochloride.

15. The composition of claim 1, wherein the base comprises a nitrogenous base.

16. The composition of claim 1, wherein the weak base comprises a base that is selected from an amide, an ester of carbonic acid, a carbamate, and an amino acid.

17. The composition of claim 1, wherein the weak base is an alkanolamine.

18. The composition of claim 1, wherein the one or more metallic salts include $Cu^{2+}$.

19. The composition of claim 1, wherein the one or more metallic salts include $Fe^{2+}$.

20. The composition of claim 1, wherein the first acid comprises an acid that is selected from phosphoric acid and pyrophosphoric acid.

21. A composition as recited in claim 1, wherein the weak base is obtained from an organic salt that is a combination of at least the first acid and the weak base, and wherein the first acid comprises an acid that is selected from nitric acid, hydrochloric acid, hydrogen bromide, hydrogen iodide, hydrogen fluoride, formic acid, and acetic acid.

22. A composition as recited in claim 1, wherein the weak base comprises a base selected from urea, acetylurea, an alkanolamine, an alkylamine, a polymer having a nitrogen-containing heterocyclic group, an amide, a cyclic amide, a pyrollidone, a polyvinyl pyrollidone, a copolymer of vinyl pyrollidone, a methacrylamide, a polymethacrylamide, a copolymer of methacrylamide, ammonia, guanidine, hydroxyurea, semicarbazide, methoxylamine, aniline, and hydrazine.

23. A composition as recited in claim 22, wherein the alkonolamine comprises a base selected from triethanolamine, diethanolamine, and monoethanolamine.

24. A composition as recited in claim 22, wherein the polymer having a nitrogen-containing heterocyclic group comprises a base selected from pyridine, pyrimidine, imidazole, tetrazole, pyrazine, quinoline, isoquinoline, indole, isoindole, benzimidazole, purine, pyrrole, isopyrazole, quinazoline, pyridazine, pyrazine, cinnoline, phthalazine, quinoxaline, xanthine, hypoxanthine, and pteridine.

25. A composition as recited in claim 22, wherein the amide comprises a base that is selected from formamide, acetamide, a polymer acrylamide, and a copolymer of acrylamide.

26. A composition as recited in claim 22, wherein the cyclic amide comprises caprolactam.

27. A composition as recited in claim 21, wherein the organic salt comprises urea hydrochloride.

28. A composition as recited in claim 1, wherein the composition is an aqueous solution.

29. The composition of claim 1, wherein the first acid and base are supplied as urea monohydrochloride, the one or more metallic salts comprise $FeCl_2$, and a defoamer including a polysiloxane.

30. An acidic coloring composition that colors a cementitious or mineral substrate, said composition that includes ingredients comprising:
  a) a first acid;
  b) a weak base, wherein the conjugate acid of the weak base has a pKa less than 7 and greater than the pKa of the first acid; and
  c) one or more metallic salts that impart a color to the cementitious or mineral substrate when the composition is applied to and chemically reacts with the cementitious or mineral substrate.

31. The composition of claim 30, wherein the weak base is a substituted urea.

32. The composition of claim 30, wherein the weak base is urea.

33. The composition of claim 30, wherein the weak base and the strong acid are supplied as a hydrochloride.

34. The composition of claim 30, wherein the one or more metallic salts include iron.

35. An acidic coloring composition that colors a cementitious or mineral substrate, said composition that includes ingredients comprising:
  a) a first acid;
  b) a weak base that decomposes into a stronger base when the composition contacts the substrate; and
  c) one or more metallic salts that impart a color to the cementitious or mineral substrate when the composition is applied to and chemically reacts with the cementitious or mineral substrate.

* * * * *